United States Patent
Soldavini

[19]

[11] Patent Number: 5,887,698
[45] Date of Patent: Mar. 30, 1999

[54] METHOD AND APPARATUS FOR SORTING ARTICLES RECEIVED FROM VERTICALLY SPACED PLATFORMS OF A MOVING TRANSPORT DEVICE

[75] Inventor: Attilio Soldavini, Ferno-VA, Italy

[73] Assignee: Sandvik AB, Sandviken, Sweden

[21] Appl. No.: 748,950

[22] Filed: Nov. 15, 1996

[30] Foreign Application Priority Data

Nov. 16, 1995 [IT] Italy .................................. MI950786 U

[51] Int. Cl.⁶ ........................... B65G 37/00; B65G 11/20; B07C 9/00
[52] U.S. Cl. ........................ 198/360; 198/348; 198/358; 198/359; 198/363; 193/31 A; 193/31 R; 209/657
[58] Field of Search ..................................... 198/360, 358, 198/348, 435, 436, 363, 359; 209/657; 193/31 A, 31 R

[56] References Cited

U.S. PATENT DOCUMENTS

| | | | |
|---|---|---|---|
| 684,250 | 10/1901 | Holmes | 193/31 R |
| 5,090,544 | 2/1992 | Carroll | 193/31 A |
| 5,377,847 | 1/1995 | Kind | 209/657 |
| 5,464,089 | 11/1995 | Shapcott | 198/392 |
| 5,740,901 | 4/1998 | Lazzarotti et al. | 198/444 |

FOREIGN PATENT DOCUMENTS

| | | | |
|---|---|---|---|
| 58-193828 A | 11/1983 | Japan | 198/358 |
| 58-212518 A | 12/1983 | Japan | 198/358 |
| 2111933 | 7/1983 | United Kingdom | B65G 47/34 |

*Primary Examiner*—David A. Bucci
*Assistant Examiner*—Steven B. McAllister
*Attorney, Agent, or Firm*—Burns, Doane, Swecker & Mathis, L.L.P.

[57] ABSTRACT

A hopper receives upper and lower articles delivered simultaneously from a mobile transport device having superimposed transport platforms. Disposed within the hopper are independently movable diverters for diverting the articles to proper outlets of the hopper. The diverters comprise rotatable plates able to divert both of the upper and lower articles to either a first outlet or a second outlet, or to divert one of the articles to the first outlet, and the other article to the second outlet.

9 Claims, 3 Drawing Sheets

5,887,698

METHOD AND APPARATUS FOR SORTING ARTICLES RECEIVED FROM VERTICALLY SPACED PLATFORMS OF A MOVING TRANSPORT DEVICE

BACKGROUND OF THE INVENTION

The invention relates to the high-speed, high-volume conveying of small articles which are to be sorted by being conveyed from a loading station to one of a number of discharged hoppers disposed along a conveying path. In particular, the invention relates to the discharge hoppers.

Such a conveying/sorting apparatus is used to sort articles such as packages in mail-order facilities and courier services, for example. The apparatus typically includes a rail which defines the conveying path, and a number of transport devices which travel along the rail between the loading and collecting stations. Each transport device includes a platform, such as a driven endless belt, which receives articles at the loading station and discharges them onto collection devices at respective collective stations.

Various types of conveying/sorting machines are known; in particular, commonly owned patent GB 2,111,933, relates to a sorting plant which comprises a number of transport devices, each having a rotation apron or belt constituting an article transport and unloading platform. The transport devices move along a fixed route lines with hoppers designed to collect, and thereby sort, the articles. The articles, suitably coded on the basis of their destination, are loaded into individual cells in a loading station where sensing devices (e.g., scanners) check the type of parcel (size, weight, etc.), match each parcel with a transport platform, and load the articles into respective transport devices passing through the loading station. The transport device then transports its article to the respective hopper and discharges the article into the hopper.

The use of hoppers that are capable of carrying out a further sorting of the discharged articles is known for example from Italian Patent No. 1,122,898. Those hoppers comprise one or more tiltable bulkheads or plates capable of selectively defining various channeling routes into which the discharged article can be addressed. That kind of hopper is particularly advantageous because, it enables the degree of sorting to be increased without increasing the number of final destinations for the transport devices, and without increasing the length of the plant. Thus, the plant manufacturing costs are minimized, without actually affecting the performance as a whole.

In an effort to maximize the performance of a plant, i.e., to increase the number of objects handled per hour, it has been proposed to use transport devices each having transport platforms arranged on two vertically superposed planes (see concurrently filed application Ser. No. 08/749,230 (attorney docket no. 024444-294).

The object of the present invention is to provide a discharge hopper that is capable of receiving and sorting articles received simultaneously from such superposed transportation platforms, to enable them to be sent to the same or different final containers.

A further object of the present invention is to provide such a hopper which operates in a reliable, simple way and which is not too expensive to manufacture.

SUMMARY OF THE INVENTION

Those objects as well as other objects are achieved by means of a discharge hopper having first and second relatively movable diverters disposed between a mouth and two outlet passages of the hopper. The diverters are positionable to simultaneously divert upper and lower articles from the mouth to selective ones of the outlet passages. The diverters can be positioned to divert both of the upper and lower articles either to the first outlet passage or to the second outlet passage, or to divert the upper article to the second outlet passage and the lower article to the first outlet passage.

BRIEF DESCRIPTION OF THE DRAWING

Further features and advantages of the invention will appear from the description of a preferred embodiment that is shown in an exemplary, non-limiting way in the attached drawings in which.

DETAILED DESCRIPTION OF PREFERRED EMBODIMENT OF THE INVENTION

Figure 1:
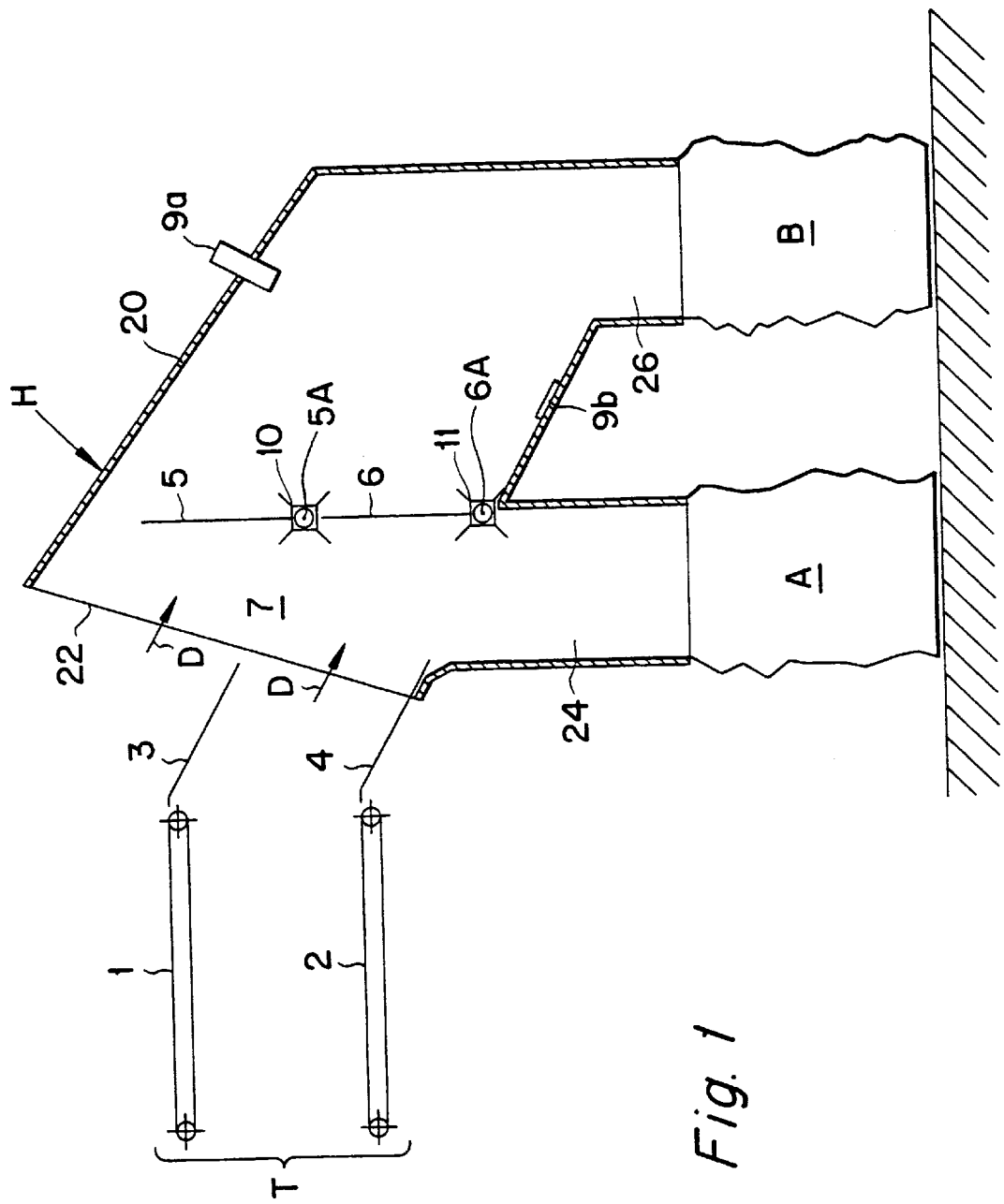
FIG. 1 is a schematic cross-sectional view of a hopper according to the invention, said hopper being arranged to direct both of the upper and lower articles discharged from two transportation platforms towards a first outlet.
Figure 2:
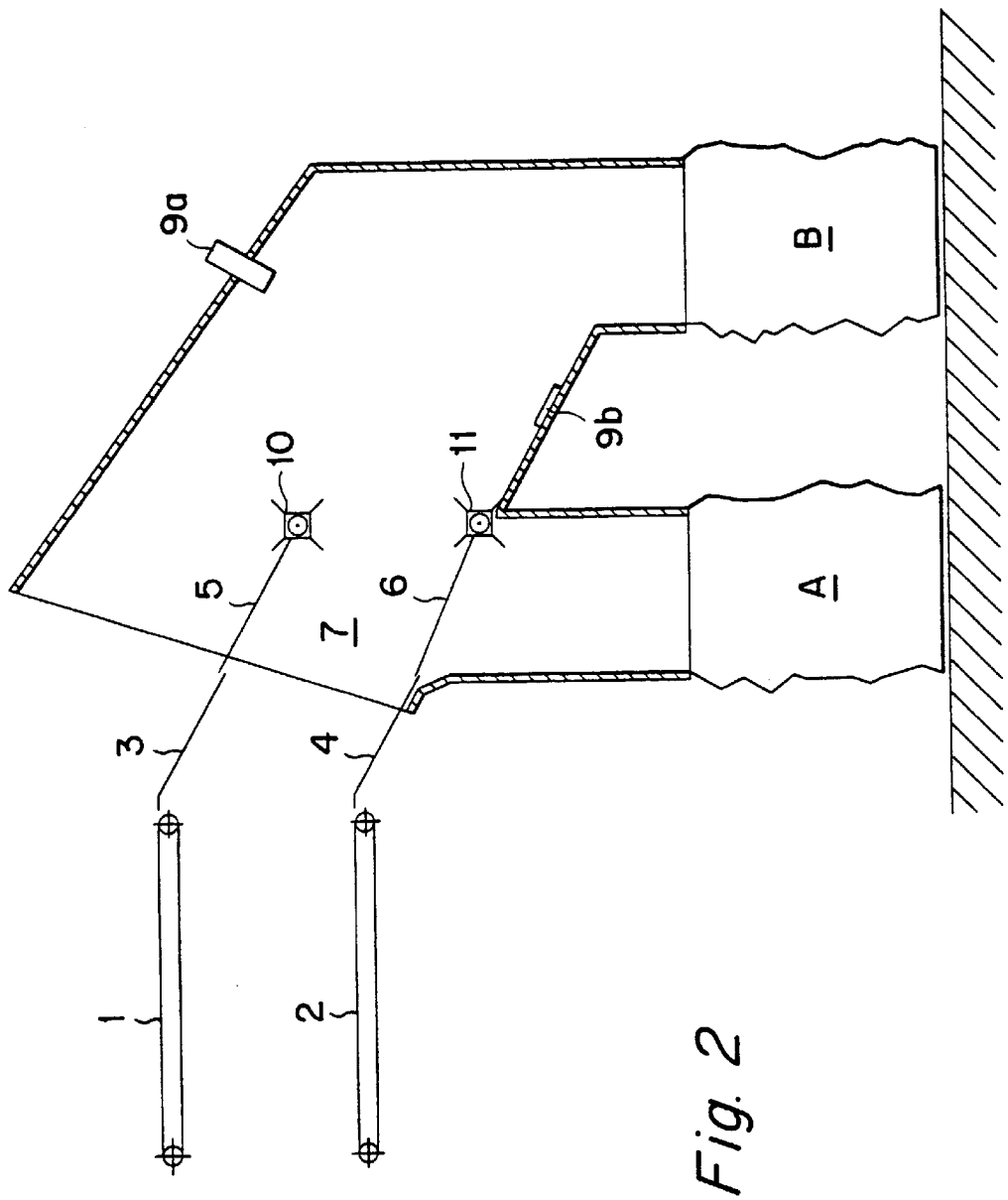
FIG. 2 is a schematic cross-sectional view of the hopper of FIG. 1, arranged to direct both of the upper and lower articles towards a second outlet.
Figure 3:
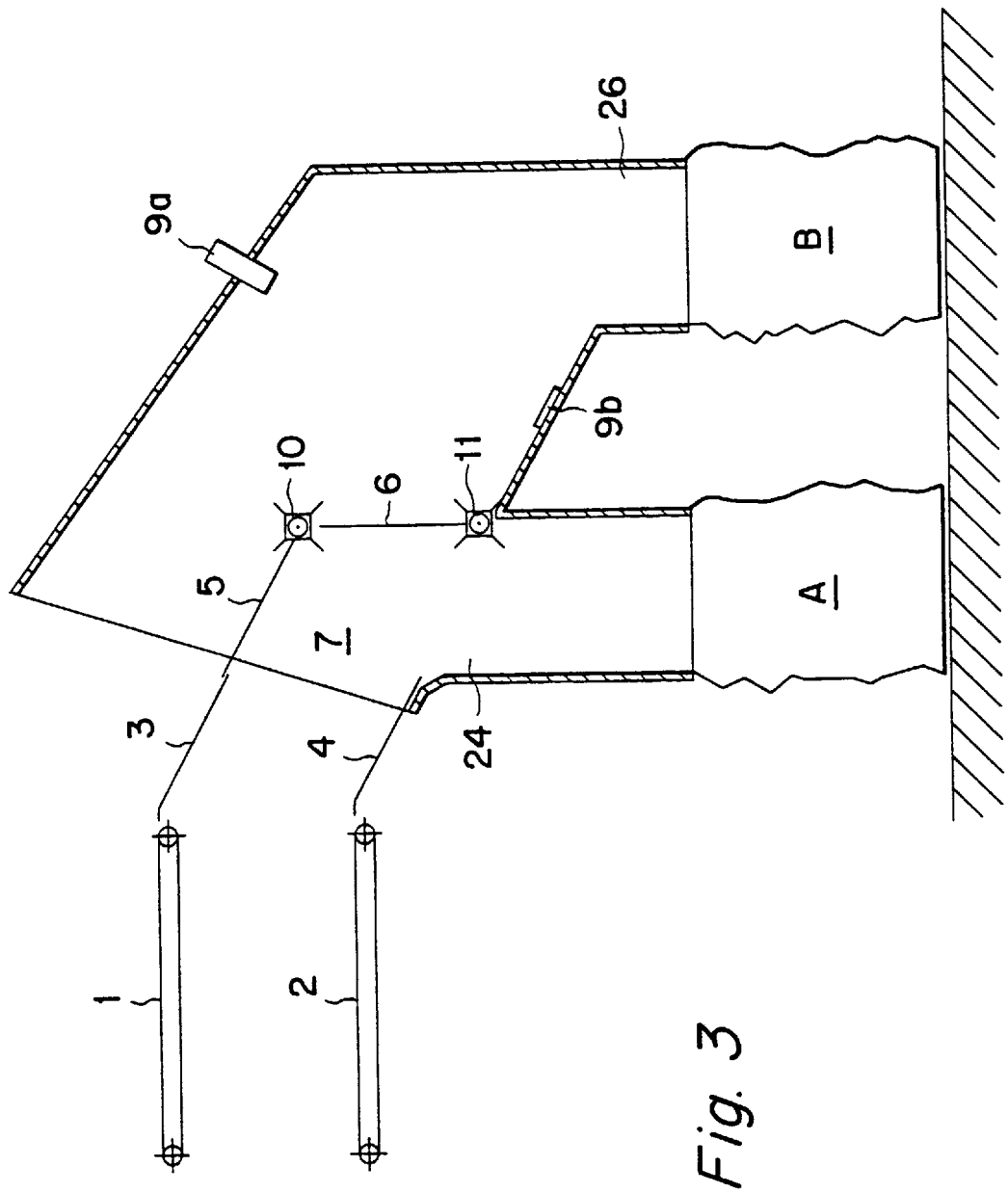
FIG. 3 is a cross-sectional view of the same hopper, arranged to direct the articles towards respective outlets.

Referring to FIGS. 1–3, the upper and lower transportation platforms 1 and 2, respectaively of a mobile transport device T are shown. Those platforms comprise, for example, rotary mats or belts that are actuated to carry out an article discharge operation when the mat passes in registry with a particular hopper H.

A couple of superposed inclined plates or chutes 3, 4 are mounted on one side of the hopper H in order to receive and guide the articles discharged from mats 1 and 2.

The discharge hopper H comprises a frame 20 forming an inclined (or alternately vertical) mouth or inlet 22 (the height of which is greater that the sum of the distance between mats 1 and 2 plus the maximum accepted dimension of the articles), and upstream and downstream outlet passages 24, 26 which are larger than the articles to be discharged. The outlet passages are arranged in succession (i.e., one behind the other with reference to the inlet 22) and communicate with respective containers A and B. Also provided are two mobile bulkheads or plates 5, 6 mounted to rotate about axes 5A, 6A respectively, lying on an essentially vertical common plane. The axes 5A, 6A are disposed below the respective mats 1, 2, and a vertical spacing between the axes 5A, 6A is about the same as the vertical spacing between the mats. Each bulkhead 5, 6 can be displaced from a first position, in which each mobile bulkhead is aligned with the related chute 3 or 4, to a second, essentially vertical position in which it stops the forward motion of a discharged article, thereby causing it to fall into the upstream passage 24 and the associated container A.

The bulkheads 5 and 6 constitute plates which are hinged at their lower edges and can be rotated independently of one another, for example by means of electric motors 10, 11, or fluid motors such as pneumatic pistons, or the like. This configuration, with the bulkheads hinged at their lower edges, is preferable because the bulkheads 5 and 6, by closing their related passageways, act as a barrier and reflect back the articles that, owing for example to a wrong discharge speed, would tend to go towards the wrong final collecting bins.

The hopper is also equipped with sensor means 9a, 9b such as photoelectric cells or the like, that are able to detect a possible obstruction of one of the channeling routes and to generate, in such a case, a related signal to so inform the operator.

The hopper according to the invention works in the following way.

When the articles coming from the mats 1 and 2 are bound for the same final container A or B, the bulkheads 5 and 6 are arranged either both vertically aligned (FIG. 1), so as to convey the objects towards container A, or both aligned with respective chutes 3 and 4 (FIG. 2) so as to direct the articles towards container B.

When, on the contrary, the articles coming from mats 1 and 2 are bound for respective collecting bins B and A, the bulkhead 5 of the upper chute 2 is aligned with the respective chute 3, so as to guide the article toward container B, whereas the lower bulkhead 6 is arranged in a vertical position so as to close the passageway leading to container B (see FIG. 3) to cause the article to fall into collecting bin A. In this way, the articles discharged from mats 1 and 2 are directed towards separate containers.

It will thus be appreciated that the second outlet passage B is disposed horizontally behind the first outlet passage A with reference to a direction of travel D of articles through the mouth 22. A space 7 overlies the first outlet passage 24 and is disposed behind the mouth 22. The upper diverter 5 is movable between first and second positions. In its first position (see FIGS. 2 and 3) the upper diverter 5 extends across an upper portion of the space 7 with a rearward/downward inclination to define a slide upon which the upper articles can slide across the space toward the second outlet passage 26. In its second position (see FIG. 1), the upper diverter 5 extends upwardly at the rear of the space to block communication of the upper portion of the mouth with the second outlet passage 26, while enabling upper articles to travel downwardly in the space 7 toward the first outlet passage.

The lower diverter 6 is also movable between first and second positions. In the first position (see FIG. 2), the lower diverter 6 extends across a lower portion of the space with a rearward/downward inclination to define a slide upon which the lower articles can slide across the space 7 toward the second outlet passage 26. In its second position (see FIGS. 1 and 3), the lower diverter 6 extends upwardly at the rear of the space 7 to block communication of the lower portion of the mouth with the second outlet passage 26, while enabling articles traveling downwardly in the space (i.e., either upper or lower articles) to enter the first outlet passage 24.

The dimensions as well as the materials can be changed according to the application needs.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed:

1. A discharge hopper adapted to simultaneously receive upper and lower articles delivered by upper and lower transfer platforms, respectively, of a mobile transfer device, said hopper comprising:

a frame forming an inlet mouth and first and second outlet passages, said mouth adapted to admit upper and lower articles simultaneously, and upper and lower relatively movable diverters disposed between said mouth and said outlet passages and being positionable to divert said upper and lower articles to selective ones of said outlet passages;

wherein said second outlet passage us disposed horizontally behind said first outlet passage with reference to a direction of travel of articles through said mouth; said first and second outlet passages being disposed below said mouth, with a space overlying said first outlet passage and disposed behind said mouth; said upper diverter being movable between a first position extending across an upper portion of said space with a rearward/downward inclination to define a slide upon which said upper articles can slide across said space toward said second outlet passage, and a second position disposed at a rear of said upper portion of said space to enable said upper articles to travel downwardly in said space toward said first outlet passage; said lower diverter being movable between a first position extending across a lower portion of said space with a rearward/downward inclination to define a slide upon which said lower articles can slide across said space toward said second outlet passage, and a second position disposed at the rear of said lower portion of said space to enable articles traveling downwardly in said space to enter said first outlet passage;

wherein each of said upper and lower diverters is formed by a plate pivotably mounted for rotation about a horizontal axis at a lower end thereof.

2. The discharge hopper according to claim 1 wherein said mouth constitutes a single opening sized to admit said upper and lower articles simultaneously, said mouth extending generally vertically.

3. The discharge hopper according to claim 1 further including a drive mechanism for rotating said upper and lower plates relative to one another.

4. The discharge passage according to claim 1 wherein said horizontal axes lie on a common, substantially vertical plane disposed between said first and second outlet passages.

5. The discharge hopper according to claim 1, wherein said upper diverter plate, when in its second position, extends generally upwardly to block communication of said upper portion of said mouth with said second outlet passage; said lower diverter plate, when in its second position, extending generally upwardly to block communication of said lower portion of said mouth with said second outlet passage.

6. The discharge hopper according to claim 1 further including a sensor for detecting the presence of article jam-ups within said housing.

7. The discharge hopper according to claim 6 wherein said sensor is located between said diverter plates and said second discharge passage.

8. The discharge hopper according to claim 6 wherein the sensor is a photocell.

9. The discharge hopper according to claim 1, further including first and second motors connected to said first and second diverter plates, respectively, for moving said first and second diverter plates independently of one another.

\* \* \* \* \*